(12) United States Patent
Seely et al.

(10) Patent No.: US 7,883,102 B1
(45) Date of Patent: Feb. 8, 2011

(54) APPARATUS FOR ALIGNING TRAILER HITCH

(76) Inventors: John E. Seely, 895 C. R. 2480, Hico, TX (US) 76457; Tommy R. Thompson, 895 C. R. 2480, Hico, TX (US) 76457

( * ) Notice: Subject to any disclaimer, the term of this patent is extended or adjusted under 35 U.S.C. 154(b) by 0 days.

(21) Appl. No.: 12/576,424

(22) Filed: Oct. 9, 2009

(51) Int. Cl.
*B60D 1/36* (2006.01)
(52) U.S. Cl. ...................................................... 280/477
(58) Field of Classification Search ................. 280/477
See application file for complete search history.

(56) References Cited

U.S. PATENT DOCUMENTS

| 6,341,794 | B1 * | 1/2002 | Hunter | 280/477 |
| 7,506,887 | B2 | 3/2009 | Seely et al. | |
| 2005/0173891 | A1 * | 8/2005 | LeBouef | 280/477 |
| 2007/0175053 | A1 * | 8/2007 | Seely et al. | 33/264 |
| 2009/0250900 | A1 * | 10/2009 | Zilm | 280/432 |

* cited by examiner

*Primary Examiner*—Tony H. Winner
(74) *Attorney, Agent, or Firm*—James E. Walton

(57) ABSTRACT

A fixture designed to hasten and ease aligning a trailer, in particular a gooseneck trailer, to a receiver ball situated on a vehicle by using a drop rod to signal the driver when the optimum hitching point is reached.

18 Claims, 2 Drawing Sheets

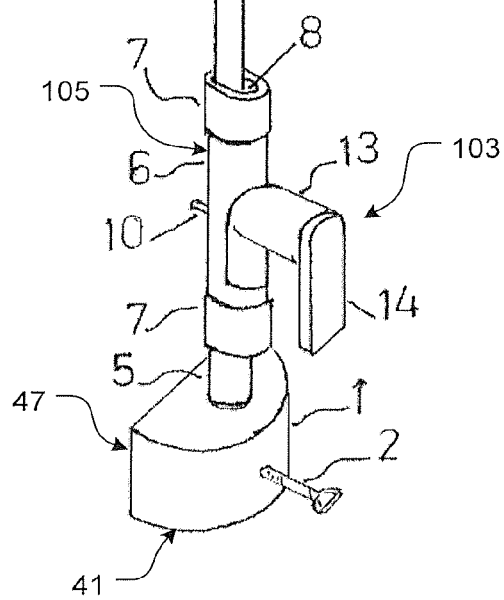
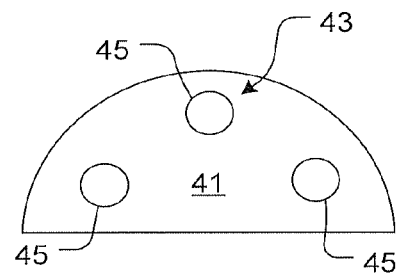
Fig. 3
Fig. 1
Fig. 4

APPARATUS FOR ALIGNING TRAILER HITCH

BACKGROUND

1. Technical Field

The present application relates generally to the field of hitches and, more particularly, to hitches for towing a trailer.

2. Description of the Prior Art

The present invention involves attaching a gooseneck trailer to a vehicle. However, it can be applicable for some conventional trailer hookups as well. Gooseneck trailers have a towing tongue longer than conventional trailers. The attachment point on the tongue is bent down and connects to a towing ball. The ball is on a hauling bed, and centered over the rear axle, of a towing vehicle. The vehicle most commonly used is a farm type truck. The bend allows the towing tongue of a gooseneck trailer to swing past raised sides of a truck bed for necessary turns.

Many trucks designed to tow conventional trailers have a receiver hitch mechanism. This system extends out from the rear bumper, thus, it can be compatible to the present invention also.

To attach the trailer, the driver must back the truck and align the attaching point on the trailer tongue over the towing ball. This usually requires several attempts to accomplish because the driver often can't see the towing ball from his position in the truck. To simplify this task, the driver, when looking through the rear window, needs a device to show the location of the towing ball in relation to the trailer tongue when the optimum point to hitch is reached.

Although other solutions have been presented, we believe, a simple, inexpensive method should be introduced as the following invention provides.

BRIEF DESCRIPTION OF THE DRAWINGS

The novel features believed characteristic of the application are set forth in the appended claims. However, the application itself, as well as, a preferred mode of use, and further objectives and advantages thereof, will best be understood by reference to the following detailed description when read in conjunction with the accompanying drawings, wherein:

FIG. 1 is an oblique view of an apparatus for aligning a trailer hitch according the preferred embodiment of the present application;

FIG. 3 is an enlarged oblique view of a contact device of the apparatus of FIG. 1; and FIG. 4 is a bottom view of a base of the apparatus of FIG. 1.

Figure 2:
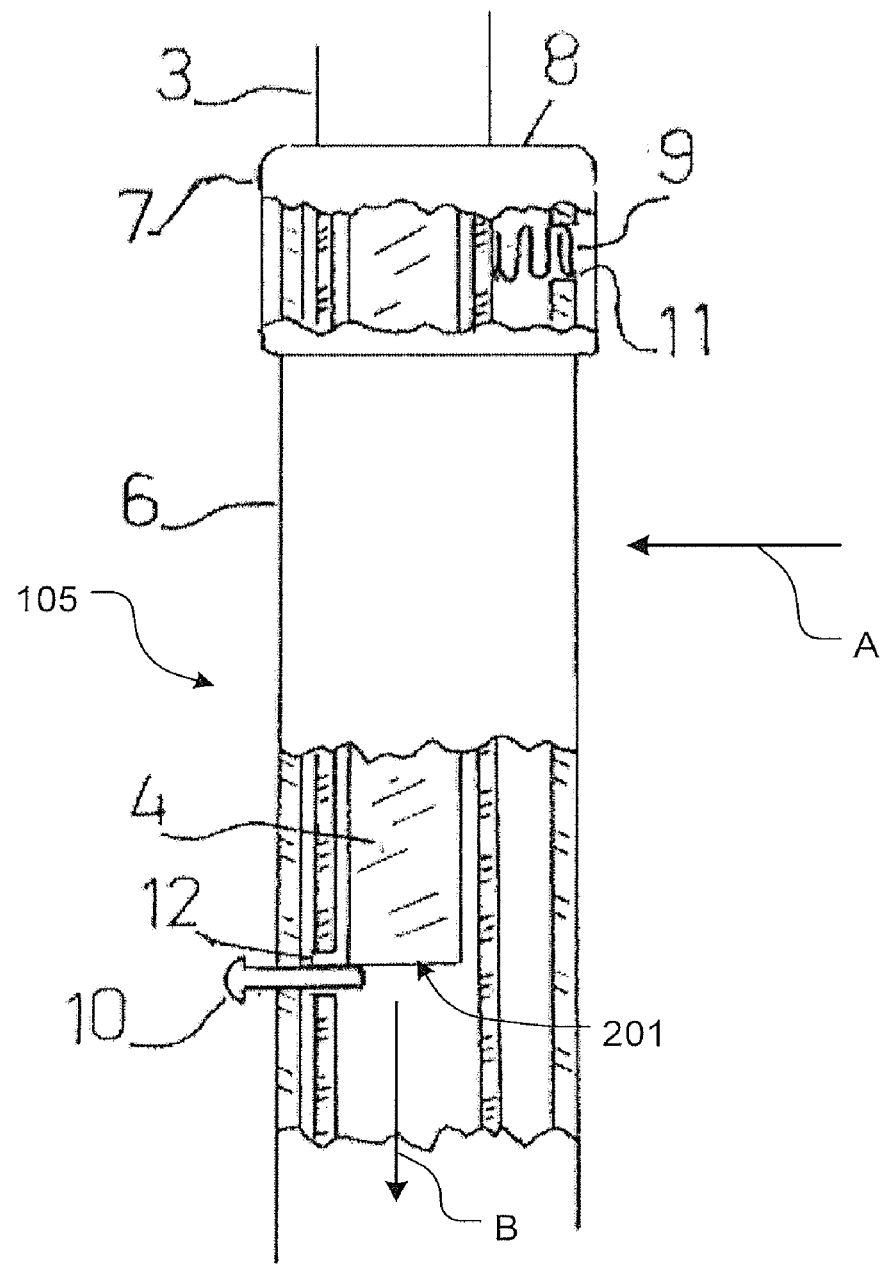
FIG. 2 is an enlarged side view of a spring loaded pipe assembly of the apparatus of FIG. 1.

While the embodiment of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

The apparatus for aligning a trailer hitch of the present application overcomes the disadvantages associated with conventional apparatuses for aligning a trailer hitch to a receiving tow ball of a towing hitch. Illustrative embodiments are described below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Notable changes to conventional apparatuses for aligning a trailer tongue with a receiver ball of a tow hitch are explained below. Changes are apparent in the manner in which the preferred apparatus is secured, in addition to having a protruded portion added to the apparatus at the point of activation. Also, an attachment device, i.e., magnets, securely couples the apparatus to a contact surface of the towing vehicle for rapid removal of the apparatus after the trailer tongue is aligned with the receiver ball.

FIG. 1 is an oblique view of an apparatus 101 for aligning a trailer tongue (not shown) for coupling with a receiver ball of a trailer hitch (not shown). Apparatus 101 includes a spacer 2 coupled to and extending from a support body 1. In the preferred embodiment, spacer 2 is an adjustable screw that is adjusted such that the body remains apart from receiver ball at a predetermined distance. It should be understood that apparatus 101 does not couple to the receiver ball, thereby reducing the time and effort exhausted in removing apparatus 101 after the trailer hitch is aligned. In the preferred embodiment, spacer 2 is a screw; however, it should be appreciated that alternative embodiments could include different devices in lieu a screw. For example, spacer 2 could be a rod having a length determined by the distance required to align a specific trailer hitch to a receiver ball.

Apparatus 101 includes a pipe 3 rigidly coupled to and extending from base 1. A spring loaded pipe assembly 6 is placed around a portion of vertical pipe 3. Pipe assembly 6 includes a sleeve 5 that separates pipe assembly 6 from body 1. Apparatus 101 includes a contact device 103 coupled to and extending from pipe assembly 6. In the preferred embodiment, contact device 103 is rigidly coupled to pipe assembly 6; however, alternative embodiments could include a contact device adjustably coupled to pipe assembly 6. Contact device 103 provides means for the trailer hitch to move pipe assembly 6. In the preferred embodiment, contact device 103 includes a first contact plate 13 and a second contact plate 14 rigidly coupled to contact plate 13. As is illustrated, second contact plate 14 extends normal to first contact plate 13 such that different trailer tongues having different heights can be used with apparatus 101.

A solid rod 4 is partially disposed within vertical pipe 3. As is illustrated, solid rod 4 remains partially exposed outside pipe 3 in an up position. In this position, the user can determine that the trailer tongue has not come into contact with apparatus 101 and that the trailer tongue is not aligned above the receiving ball. Solid rod 4 remains in the up position prior to the trailer tongue coming into contact with contact device 103. Apparatus 101 includes a stopping device 10 extending from a front portion 105 of pipe assembly 6.

FIG. 2 shows a partial view of spring loaded pipe assembly 6 with a centerline cutaway to demonstrate how the components function inside. Assembly 6 includes two top ends 7 having a slot 8 for guiding pipe assembly 6 in the transverse direction with respect to vertical pipe 3. Pipe assembly 6 includes a loaded device, such as a spring 9, for maintaining pressure against vertical pipe 3. A hole 11 partially extends through pipe assembly 6 for securing spring 9. In the preferred embodiment, stopping device 10 is a set screw; however, it should be appreciated that alternative embodiments could include different devices for holding rod 4 in a resting position. For example, an alternative embodiment could include a quick release device, i.e., a snap or a clip, for holding rod 4 in the up position. Stopping device 10 is rigidly coupled through front side 105 of pipe assembly 6. Pipe 3 includes a hole 12 for receiving stopping device 10. As is illustrated, stopping device 10 is rigidly coupled to front side 105 of pipe assembly 6, extends through hole 12, and comes into contact with bottom end 201 of rod 4.

In the preferred embodiment, two springs 9 are used to displace the pipe assembly 6. However, in alternative embodiments, one spring could be used to perform the same function as the two spring configuration.

The objective of the invention is to signal the desired position of a trailer tongue in reference to a receiver ball and is met when the tongue contacts and pushes the contact plate 14 in a direction A. Pressure applied to contact plate 14 compresses spring 9, thereby forcing stopping device 10 to back out through hole 12. Thus, stopping device 10 no longer supports the solid rod 4 in the up position. The rod 4 drops, as indicated with direction B, from an extended height inside to a lesser position above the vertical pipe 3, thereby providing a signal to the user that the trailer tongue is aligned with the receiving tow ball. When the process is complete, the apparatus is easily removed and the trailer tongue is lowered onto the receiver ball.

FIG. 3 is an enlarged view of contact device 103. Contact device 103 is used because many gooseneck trailer tongues are designed for multiple height adjustment. This requires the vertical round portion of the tongue to be two parts. One part slips inside the second with a lock pin through holes in both parts to secure. In addition, an added bolt is provided on the outer tongue part passing through to lock the enter part. The extended contact plates 13 and 14 makes the invention functional when the vertical pipe 3 on the fixture must bypass in front of the added bolt on the trailer tongue.

In accordance with the preferred embodiment of the invented fixture, the support body 1 consists of a vertical pipe 3 and spacer 2 set in and extruding from an epoxy or injected plastic mold. The spacer 2 can include a magnet or alternatively suitable device for contacting with the receiver ball. In the preferred embodiment, vertical pipe 3 and spring loaded pipe assembly 6 are composed of an elastomeric material, i.e., a PVC pipe. However, alternative embodiments could include a vertical pipe 3 and pipe assembly 6 composed of alternately suitable materials such as a metal or a composite.

In addition, it is preferred that end caps 7, sleeve 5, and partially altered elbow 13 (the extended portion of the extended contact plate) be composed of an elastomeric material such as PVC fittings. In the preferred embodiment, contact plate 14 is an elastomeric material, such as LEXAN®, which is a brand of polycarbonate resin thermoplastic. Also, injected plastic is suitable to combine the extended contact plate 13 and 14 into a single mold. In the preferred embodiment, spacer 2 and stopping device 10 are screws comprising standard grade cadmium plated fittings. Preferably, the compression springs 9 used are generated from 0.041 diameter metal stock and have at least a 6.84 lb. capacity rating. It is preferred that springs 9 are secured in the holes 11 with glue. In the preferred embodiment, rod 4 is an injected plastic or epoxy mold; however, it should be appreciated that alternative embodiments could include a rod 4 composed of alternately suitable materials such as a metal or a graphite material.

Referring now to FIG. 4 in the drawings, a bottom view of base 1 is illustrated. Base 1 includes a bottom surface 41 for abutting with a contact surface associated with the towing vehicle. In the preferred embodiment, apparatus 101 is configured for coupling directly to a contact surface on the towing hitch; however, it should be appreciated that apparatus 101 could be configured for coupling to any suitable surface on the towing vehicle. For example, apparatus 101 could be configured for coupling to the tailgate, truck bed, bumper, or chassis of the towing vehicle.

Surface 41 includes an attachment device 43 for securing apparatus 101 to the towing vehicle. Attachment device 43 provides means for a user to easily and rapidly remove the apparatus after the trailer tongue is aligned for coupling with the receiving tow ball. Attachment device 43 significantly reduces the amount of time and effort exhausted in preparing a trailer for hitching with a towing vehicle. In the preferred embodiment, attachment device 43 comprises a plurality of magnets 45 that extend partially within body 1 and remain flush with surface 41. The magnets provide sufficiently strong coupling forces between base 1 and the contact surface of the towing vehicle. In the preferred embodiment, magnets 45 are Neodymium magnets. Neodymium magnets create a sufficiently strong coupling force to hold apparatus 101 in position during use.

In the preferred embodiment attachment device 43 is a magnet; however, it should be appreciated that alternative devices could be used in lieu of magnets 45. For example, an adhesive substance such as double sided tape, a strap, a clip, or other suitable quick-release devices could be used. In addition, surface 41 could be contoured with grooves, dimples, ridges, or other contoured surfaces for providing additional friction between surface 41 and the contact surface. It should also be appreciated that apparatus 101 could include a plurality of attachment devices 43 on one or more surfaces of body 1. For example, a front surface 47 of body 1 could include an attachment device for attaching to a contact surface, i.e., a tailgate of the towing vehicle.

It is apparent that an apparatus with significant advantages for aligning a trailer tongue with a receiver ball has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present embodiments are shown above, they are not limited to just these embodiments, but are amenable to various changes and modifications without departing from the spirit thereof.

We claim:
1. A trailer hitch alignment device, comprising:
   a support body designed to securely seat a first magnet at a controlled position from a receiver ball;
   a adjustable stop screw attached to the support body for regulating the distance between the support body and the receiver ball;
   a substantially vertical pipe attached to and extending up from the support body;
   a short sleeve section situated on the vertical pipe and resting against the support body;

a solid rod extending within the vertical pipe, the rod being operable between an up position and a down position;

a spring loaded pipe disposed over a portion of the vertical pipe, the spring loaded pipe having an upper end cap and a lower end cap;

a first slot in the upper end cap and a second slot in the lower end cap;

a spring disposed between an outer surface of the vertical pipe and an inner surface of the spring loaded pipe;

a contact device attached to and extended from an outer surface of the spring loaded pipe; and a set screw coupled to the spring loaded pipe;

wherein the set screw is configured for maintaining the solid rod in an up position until the trailer hitch touches the contact device; and wherein the set screw is configured for allowing the solid rod to slide down a portion of the vertical pipe after the trailer hitch touches the contact device.

2. The trailer hitch alignment device according to claim 1, wherein the support body is composed of an elastomeric material.

3. The trailer hitch alignment device according to claim 1, further comprising:

a second magnet coupled to the stop screw;

wherein the magnet magnetically couples the stop screw with the receiver ball.

4. The trailer hitch alignment device according to claim 1, wherein the first magnet is a Neodymium magnet.

5. The trailer hitch alignment device according to claim 1, wherein the contact device is a mold formed from injected plastic material.

6. The trailer hitch alignment device according to claim 1, wherein the solid rod is composed of an injected elastomeric material.

7. The trailer hitch alignment device according to claim 1, wherein the solid rod is formed from epoxy material.

8. A device for aligning a trailer hitch with a receiver ball of a towing vehicle, comprising:

a support body;

a generally upright pipe rigidly attached to and extending from the support body;

a spring loaded pipe assembly disposed at least partially over the upright pipe;

a rod operably associated with the upright pipe and partially positioned within the upright pipe assembly, the rod being operable between an up position and a down position;

a spring for biasing the spring loaded pipe assembly relative to the upright pipe assembly;

a stopping device coupled to the spring loaded pipe assembly, the stopping device being positioned so as to support the rod in the up position when the spring loaded pipe assembly is biased relative to the upright pipe assembly;

an adjustable spacer coupled to the support body, the spacer being adjusted for separating the body from the receiver ball at a determined distance; and an attachment device for retaining the body in a position proximate to the receiver ball;

wherein the stopping device is configured for maintaining the solid rod in an up position until the trailer moves the spring loaded pipe assembly; and wherein the stopping device is configured for allowing the solid rod to slide down a portion of the vertical pipe after the trailer moves the spring loaded pipe assembly.

9. The device according to claim 8, wherein the stopping device is an adjustable screw.

10. The device according to claim 8, further comprising:

a contact device coupled to and extending from the spring loaded pipe assembly;

wherein the contact device provides means for moving the pipe assembly when the trailer hitch touches the contact device.

11. The device according to claim 10, further comprising:

a first contact plate;

a second contact plate;

wherein the first contact plate couples to and extends from spring loaded pipe assembly; and wherein the second contact plate couples to the first contact plate and extends normal to the first contact plate.

12. The device according to claim 8, wherein the attachment device is a magnet.

13. The device according to claim 12, wherein the magnet is a Neodymium magnet.

14. The device according to claim 8, wherein the attachment device is partially disposed within the base.

15. The device according to claim 8, further comprising:

a surface on the support base for abutting against a contact surface of the towing vehicle;

wherein the attachment device is partially disposed within the base and remains flushed with the surface.

16. The device according to claim 15, wherein the surface is a bottom surface.

17. The device according to claim 8, further comprising:

a second magnet coupled to the spacer;

wherein the second magnet magnetically couples the spacer with the receiver ball.

18. The device according to claim 8, wherein the spacer is an adjustable screw.

* * * * *